May 10, 1966  E. R. PEKAREK  3,250,242
CLOGGED FILTER INDICATOR DEVICE
Filed March 30, 1964
2 Sheets-Sheet 1
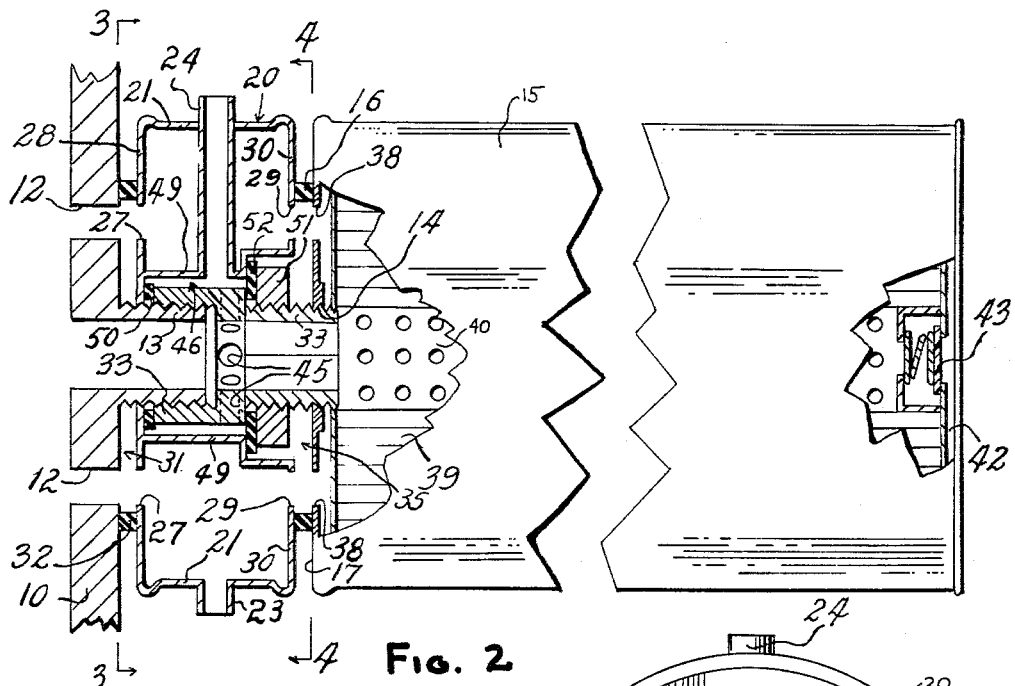
FIG. 2
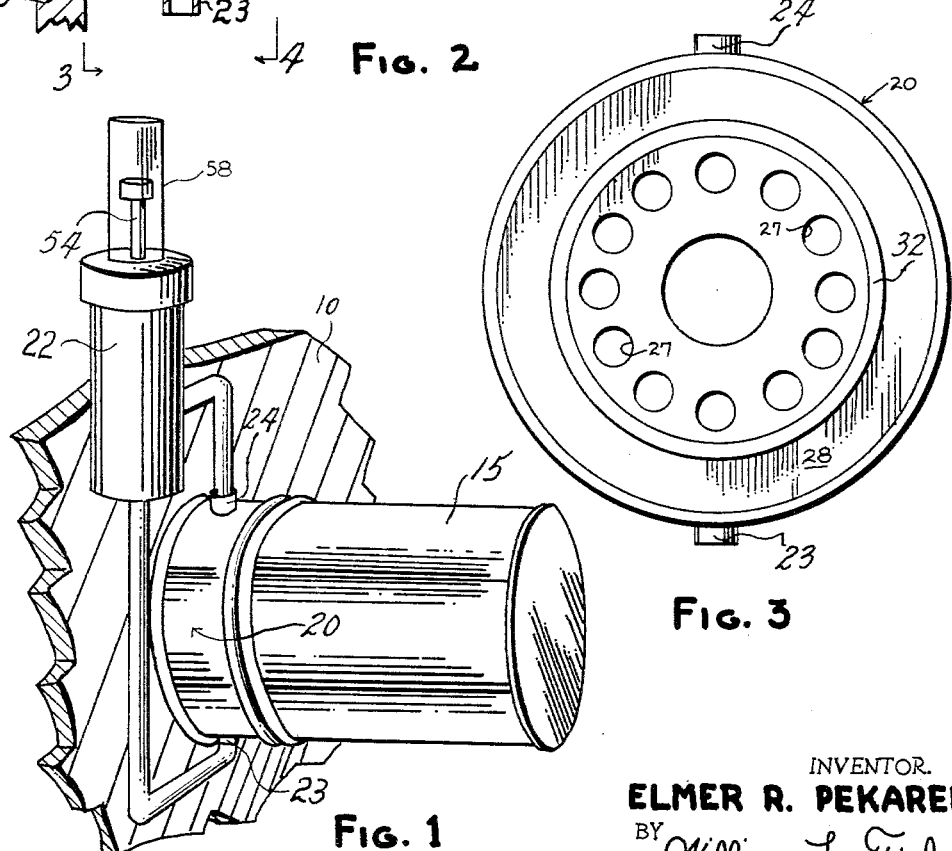
FIG. 3
FIG. 1
INVENTOR.
ELMER R. PEKAREK
BY William L. Fisher
HIS ATTORNEY May 10, 1966   E. R. PEKAREK   3,250,242
CLOGGED FILTER INDICATOR DEVICE
Filed March 30, 1964   2 Sheets-Sheet 2

INVENTOR.
ELMER R. PEKAREK
BY William L. Fisher
HIS ATTORNEY

United States Patent Office

3,250,242
Patented May 10, 1966

3,250,242
CLOGGED FILTER INDICATOR DEVICE
Elmer R. Pekarek, Detroit, Mich., assignor to
William L. Fisher, Roseville, Mich.
Filed Mar. 30, 1964, Ser. No. 355,680
15 Claims. (Cl. 116—70)

This invention concerns improvements relating to automotive oil filters.

Its principal object is the provision of process and means whereby the remaining filter life of such oil filters can be seen at a glance at the place where the filter is mounted on the engine block of an internal combustion engine.

The foregoing and other objects of the invention will become apparent during the course of the following description, taken in conjunction with the accompanying drawings, in which:

FIG. 1 is a perspective view of a differential pressure chambering device and a pressure indicating device embodying the invention shown in use with a conventional automotive throw-away type oil filter;

FIG. 2 is a longitudinal sectional view of the structure of FIG. 1;

FIGS. 3 and 4 are opposite end elevational views of said chambering device;

Figures 7, 8:
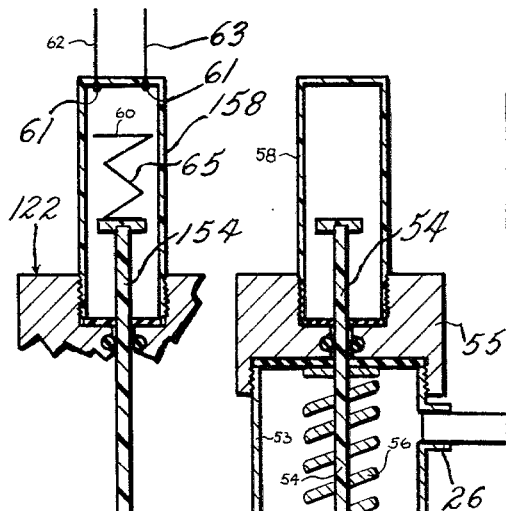
FIG. 7 is a vertical sectional view of said indicating device.
FIG. 8 is a fragmentary vertical sectional view of a modified form of said indicating device.
Figure 5:
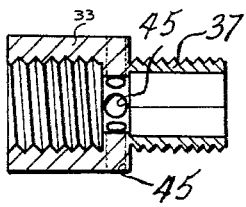
FIGS. 5 and 6 are, respectively, longitudinal sectional and end elevational views of a part of said chambering device.
Figure 6:
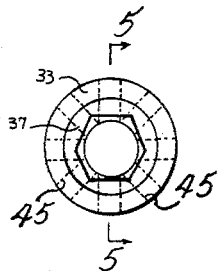
Figure 4:
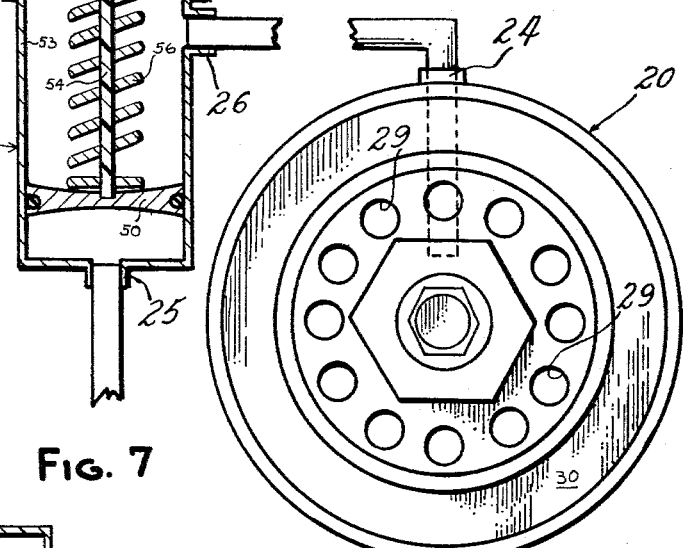

Referring to the drawings in greater detail, 10 indicates the engine block of an internal combustion engine which is provided with egress means for the pressure oil from the oil pump to pass through an oil filter external to the block 10 and with ingress means for the return oil to re-enter the block to flow to the engine bearings. Such egress and ingress means as is usual on present day automobiles are in the form, respectively, of a plurality of apertures 12 in surrounding relation to a threaded hollow boss 13. In present practice a throw-away type oil filter such as the one shown in the drawings and designated 15 is threaded on the boss 13 via its internally threaded return opening 14 and its sealing ring 16 on the outside face of its inside wall 17 is pressed against the engine block in surrounding relation to the apertures 12.

In accordance with the present invention, a chambering device designated 20 is interposed betwen the engine block and the throw-away filter 15 to provide a differential pressure to actuate a pressure indicating device 22 which gives a cumulative visual indication of the remaining filter life of the throw-away filter. Such differential pressure is that between the pressure oil from the oil pump and the return oil from the filter and is provided externally of the chambering device 20 at conduits 23 and 24 which connect, respectively, with inlets 25 and 26 of the indicating device 22. The indicating device may be disposed adjacent to or remote from the chambering device.

In the conduit 23 which opens to the side walls 21 of the chambering divice is the pressure oil from the pump which enters the chambering device through a plurality of circumferentially spaced apertures 27 in its inside wall 28 and leaves the device through similar apertures 29 in its outside wall 30. Such oil first enters a space 31 (FIG. 2) between the block 10 and the outside face of the wall 28 and within a sealing ring 32 on such face which presses against the engine block 10 outwardly of the apertures 12 as the chambering device is forced against the engine block by threading of the internally threaded member 33 on the boss 13. The pressure oil which leaves the chambering device enters a space 35 between the outside faces of the walls 30 and 17 and within the sealing ring 16 which presses against the outside face of the wall 30 outwardly of the apertures 29 as the oil filter is threaded via its opening 14 on an externally threaded boss 37 which is integral with the member 33 and projects from the outside face of the wall 30. Such pressure oil then enters the filter 15 through a plurality of circumferentially spaced apertures 38 in its bottom wall 17 within the sealing ring 16 and in the usual manner circulates around and through the filter media 39 into the perforated return tube 40 which connects with the return opening 14. In the event the filter media 39 becomes clogged the pressure oil which accumulates inside of and beneath the top wall 42 of the filter in the usual manner and at a predetermined pressure actuates a normally closed by-pass valve 43 to its open position which communicates the return tube 40 directly with the pressure oil surrounding the filter media and entering the apertures 38.

The return oil from the return tube 40 passes centrally through the chambering device 20 via the interior of the bosses 37 and 13 and into the block 10 where it is conducted to the engine bearings. Such return oil is also in the conduit 24 by virtue of radial passageways 45 in the member 33 which communicate the interior of the member 33 and the boss 37 with an annular space 46 formed between the member 33 and the inner cylindrical side walls 49 of the chambering device. The conduit 24 projects into the center of the chambering device where it opens to the wall 49 and is in communication with the space 36. A seal 50 is provided between the lower end of the member 33 and the inside face of the inside wall 28 which separates the pressure oil in the space 31 from the return oil in the space 46 which seal is tightened by threading the member 33 on the boss 13 for which purpose the interior of the boss 37 is formed with an Allen type wrench socket as shown. The inner wall 49 is radially enlarged at its outer end to accommodate a member 51 which threads on the boss 37 and bears against a seal 52 which presses against a shoulder formed between the inner wall 49 and its enlargement to separate the pressure oil in the space 35 from the return oil in the space 46.

The pressure oil in the conduit 23 enters the inlet 25 on the indicating device 22 and the return oil in the conduit 24 enters the inlet 26 and the two oil streams provide a differential pressure across a piston 50 which is slideable in the cylinder body 53 of the indicating device. The piston rod 54 of the piston 50 projects outwardly of one end of the body 53 to provide a visual indication at all times of the difference in pressure of the two oil streams. A member 55 which has an integral bore equal in diameter to the piston rod 54 through which the rod slides is threaded on said one end of the body 53 and is provided with a radial recess which retains an O-ring as shown which makes a sliding seal with the piston rod. When the two pressures on opopsite sides of the piston 50 are nearly the same corresponding to a clean condition of the filter media 39 the piston 50 is held in a predetermined position in the body 53 by a compression spring 56 which is disposed on the rod side of the piston 50 in concentric relation to the piston rod 54. As the filter media 39 becomes clogged the differential pressure across the piston 50 increases in opposition to the spring 56 and moves the piston rod 52 outwardly of the body 53 relative to a transparent sight tube 58 which threads into the member 55. The tube 58 preferably is graduated so that each quarter, for example, of the total travel of the piston rod 52 can be seen at a glance indicating what part of the filter life of the filter has been used and what part remains. The indicating device can be constructed so that full travel of the piston rod 52 indicating a need to change the filter is reached when the differential pressure attains about 8 lbs./sq. in. which is the condition in a clogged filter since about 9 to 9.5 lbs./sq. in. is the usual pressure at which the by-pass valve 43 is set to open.

In the modified form of indicating device shown in FIG. 8 which is designated 122 the movement of the piston rod 154 is utilized to carry a switch contact member 60 against switch contacts 61 which make a power circuit represented by conductors 62 and 63 to light a lamp which may be remotely located as on the dashboard of the automobile to give visual warning of the clogged condition of the filter. The compression spring 65 between the contact member 60 and the piston rod 154 effects closing of the switch prior to the end of the travel of the piston rod to give continuous visual warning for a predetermined time before complete clogging of the filter.

Figure 9:
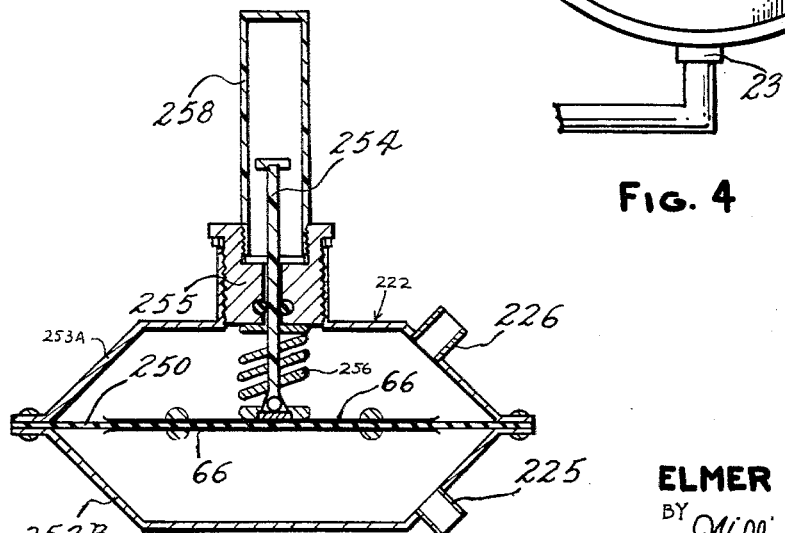
FIG. 9 is a vertical sectional view of another modified form of said indicating device.

The form of indicating device shown in FIG. 9 is designated 222 and comprises a diaphragm 250 which is secured about its circumference by the two parts 253A and 253B of the body of the device 222 and which is centrally sandwiched to control and limit its travel between metal members 66 one of which is joined to a rod 254 which slides in a member 255 threadably engaged in the body part 253A. The member 255 is provided with means to retain an O-ring for making a sliding seal with the rod 254 and threadably engages a sight tube 258 in which the end of the rod 254 is visible. The inlets 225 and 226 of the indicating device 222 connect, respectively, with the conduits 23 and 24 of the chambering device to provide a differential pressure across the diaphragm to move it in opposition to a spring 256 relative to the sight tube 258 so that the remaining life of the filter can be seen at a glance at the position of the rod 254 within the tube 258.

It will thus be seen that there has been provided by the present invention improvements relating to automotive oil filters in which the object hereinabove set forth together with many other thoroughly practical advantages has been successfully achieved, while a preferred embodiment of the invention has been shown and described it is to be understood that modifications, variations and changes may be resorted to without departing from the ambit of the invention as defined by the appended claims.

What is claimed is:

1. In an automotive oil filtering system for filtering the lubricating oil for an internal combustion engine in which such oil passes in separate pressure and return oil streams between the engine block of such an engine and an automotive oil filter and in which the engine block is provided with filter mounting structure by which the filter is supported on said block, means assisting in providing visual indication of the remaining filter life of the automotive oil filter comprising a chambering device interposed between the engine block and the oil filter, the chambering device mounted directly on the engine block and the filter directly on the chambering device, said chambering device providing passageways to separately pass the pressure and return oil streams flowing between said block and said filter, said chambering device also providing other passageways to separately tap off a portion of each of said oil streams, said chambering device constructed on one end the same as the corresponding end of the filter to replace the latter for engagement with the filter mounting structure on said block, and said chambering device constructed on its opposite end the same as the engine block filter mounting structure to replace the latter for engagement with said corresponding filter end, whereby the chambering device mounts directly on the engine block and the filter directly on the chambering device.

2. Means as claimed in claim 1 in which the chambering device is cylindrical and of substantially the same diameter as the filter.

3. In an automotive oil filtering system for filtering the lubricating oil for an internal combustion engine in which such oil passes in separate pressure and return oil streams between the engine block of such an engine and an automotive oil filter and in which the engine block is provided with filter mounting structure by which the filter is supported on said block, means assisting in providing visual indication of the remaining filter life of the automotive oil filter comprising a chambering device interposed between the engine block and the oil filter, said chambering device providing passageways to separately pass the pressure and return oil streams flowing between said block and said filter, said chambering device also providing other passageways to separately tap off a portion of each of said oil streams, said chambering device having inner and outer cylindrical side walls, and conduit opening to and connected with each such side wall, the two conduits projecting externally of the body of the device to provide thereat said portions of the pressure and return oil streams flowing between said block and said filter.

4. Means as claimed in claim 3 including a member which engages the filter mounting structure on said block, said member having means including filter mounting structure the same as on the engine block for engaging the filter, whereby the chambering device mounts directly on the engine block and the filter directly on the chambering device.

5. In an automotive oil filtering system for filtering the lubricating oil for an internal combustion engine in which such oil passes in separate pressure and return oil streams between the engine block of such an engine and an automotive oil filter supported on said block, means assisting in providing visual indication of the remaining filter life of the automotive oil filter comprising a chambering device interposed substantially entirely between the engine block and the oil filter, said chambering device providing passageways to separately pass the pressure and return oil streams flowing between said block and said filter, said chambering device also providing other passageways to separately tap off a portion of each of said oil streams, said chambering device having inner and outer cylindrical side walls, and end walls each having circumferentially spaced apertures therein, a sealing ring on one of said end walls radially outward of said apertures for sealing against the engine block, and a threaded member projecting from the other of said end walls for mounting the filter.

6. In an automotive oil filtering system for filtering the lubricating oil for an internal combustion engine in which such oil passes in separate pressure and return oil streams between the engine block of such an engine and an automotive oil filter supported on said block, means providing visual indication of the remaining filter life of the automotive oil filter comprising a chambering device interposed substantially entirely between the engine block and the oil filter, the chambering device mounted directly on the engine block and the filter directly on the chambering device, said chambering device providing passageways to separately pass the pressure and return oil streams flowing between said block and said filter, said chambering device also providing other passageways to separately tap off a portion of each of said oil streams, a pressure indicating device mounted on the chambering device for receiving such oil stream portions from the chambering device and sensing the differential pressure between them, said pressure indicating device including a member which is moveable in proportion to such dfferential pressure.

7. Means as claimed in claim 6 which includes a cylinder and piston and in which said member is the piston rod for the piston.

8. Means as claimed in claim 6 which includes a diaphragm and in which said member is a rod affixed to the diaphragm.

9. Means as claimed in claim 6 and which includes a sight tube in which said member is moveable whereby the clogged condition of the filter can be determined at a glance at the traveled position of said member in the sight tube.

10. Means as claimed in claim 6 and which includes a stationary electrical contact and a moveable electrical contact carried by said member to engage the stationary contact at a predetermined time in the movement of said member to close an electrical circuit.

11. In an automotive oil filtering system for filtering the lubricating oil for an internal combustion engine in which such oil passes in separate pressure and return oil streams between the engine block of such an engine and an automotive oil filter supported on said block, means providing visual indication of the filter life of the automotive oil filter comprising a pressure indicating device for receiving a portion of each of the pressure and return oil streams flowing between the engine block and oil filter and sensing the differential pressure between them, said pressure indicating device including a member which is moveable in proportion to such differential pressure.

12. Means as claimed in claim 11 which includes a cylinder and piston and in which said member is the piston rod for the piston.

13. Means as claimed in claim 11 which includes a diaphragm and in which said member is a rod affixed to the diaphragm.

14. Means as claimed in claim 11 and which includes a sight tube in which said member is moveable whereby the clogged condition of the filter can be determined at a glance at the traveled position of said member in the sight tube.

15. Means as claimed in claim 11 and which includes a stationary electrical contact and a moveable electrical contact carried by said member to engage the stationary contact at a predetermined time in the movement of said member to close an electrical circuit.

References Cited by the Examiner

UNITED STATES PATENTS

| Number | Date | Name | Class |
|---|---|---|---|
| 960,341 | 6/1910 | Kincaid | 116—117 X |
| 1,173,038 | 2/1916 | Roschanek | 116—117 X |
| 1,265,676 | 5/1918 | Klump | 73—406 |
| 1,300,291 | 4/1919 | Morris | 116—117 |
| 1,631,714 | 1/1927 | Wellman | 116—127 |
| 2,333,188 | 11/1943 | Loughin | 116—65 |
| 2,348,651 | 5/1944 | Schelly | 210—140 |
| 2,499,494 | 3/1950 | Greer | 210—62 |
| 2,510,663 | 6/1950 | Schuessler | 116—118 |
| 2,622,737 | 12/1952 | Balley | 210 |
| 2,638,581 | 5/1953 | Marvel | 340—240 |
| 2,669,707 | 2/1954 | Ehrman | 340—239 |
| 2,905,136 | 9/1959 | Jukes | 116—70 |
| 2,935,040 | 5/1960 | Steensen | 116—117 |
| 2,995,249 | 8/1961 | Boeive | 210 |
| 3,028,009 | 4/1962 | Scavuzzo et al. | 116—117 X |
| 3,061,101 | 10/1962 | Humbert | 210 |
| 3,066,803 | 12/1962 | Seils | 210—249 |
| 3,076,551 | 2/1963 | Humbert | 210—232 |
| 3,085,432 | 4/1963 | Bloom et al. | 73—228 |
| 3,095,370 | 6/1963 | Krogman | 210—249 |
| 3,103,952 | 9/1963 | Whiting | 137—557 |
| 3,114,320 | 12/1963 | Hughes | 200—83 |

LOUIS J. CAPOZI, *Primary Examiner.*